March 27, 1934.　　　C. T. WALTER　　　1,952,644

HOLDER

Filed Jan. 27, 1932

Charles T. Walter
INVENTOR

BY (signature)
ATTORNEY

WITNESS
(signature)

Patented Mar. 27, 1934

1,952,644

UNITED STATES PATENT OFFICE 1,952,644

HOLDER

Charles T. Walter, Chicago, Ill., assignor to Swift and Company, Chicago, Ill., a corporation of Illinois Application January 27, 1932, Serial No. 589,183

2 Claims. (Cl. 146—216)

The invention relates to a holder for sausage meat and other products.

The object of the present invention is to provide a simple, practical and efficient sausage meat holder of strong, durable and comparatively inexpensive construction designed to be employed as a kitchen utensil and adapted for holding short lengths of a new triangular shaped sausage specialty and other products of a similar shape while slicing.

A further object of the invention is to provide a holder of this character which will be effective in holding such meat and other products to the very end while slicing and which will lend itself to lithographing, and therefore, form a very effective piece of more or less permanent advertising.

Another object of the invention is to provide a sausage meat holder which may be easily gotten into the home and which, because of its cheapness and utility, will form an attractive radio souvenir.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the accompanying drawing in which is illustrated the preferred embodiment of the invention, 1 designates a meat holder designed to be constructed of sheet metal or other suitable material, and when constructed of sheet metal is formed from a blank consisting of a single piece of sheet metal bent transversely at right angles to form a horizontal base 2 and a vertical plate or wing 3 adapted to present a flat vertical face to a triangular shaped piece 4 of sausage meat or other product which is of triangular form and designed to be sliced to form convenient filling for sandwiches.

Two of such slices, in practice, will be placed in the rectangular sandwich, but as sandwiches are usually made from two slices of bread cut diagonally the slices of sausage meat or other material may be conveniently placed between two pieces of such diagonally cut sandwich bread.

Figure 1:
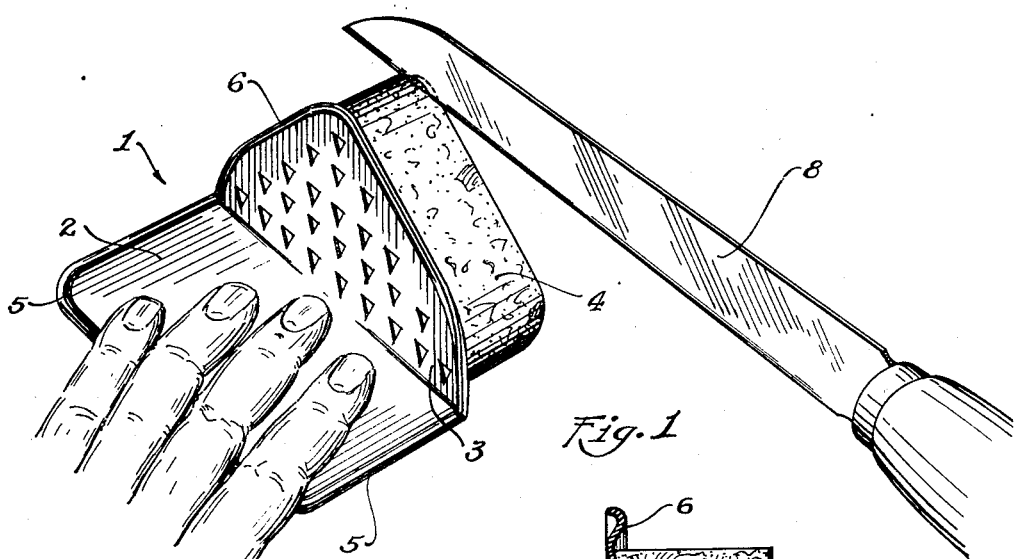
Figure 1 is a perspective view of a sausage meat holder constructed in accordance with this invention and shown applied to a short length of sausage meat.

The base 2 which is flat and adaptd to be readily held against a supporting surface by the fingers of one hand, as illustrated in Fig. 1 of the drawing, is provided with a marginal bead 5 formed by stamping or otherwise shaping the sheet metal or other material, and extending outwardly from the face of the base 2 to present a smooth marginal edge to prevent cutting or scratching the hand of the operator. Both the edge of the bead 5 and the flat lower face of the base 2 rests upon the supporting surface upon which the piece 4 and the holder are placed. The flat smooth unbroken surface of the base 2 is adapted to receive advertising or other matter by lithographing the same thereon or applying such matter by a label or any other suitable means, and the lower face of the base forms a convenient place for other information, such as directions for using the device.

Figure 2:
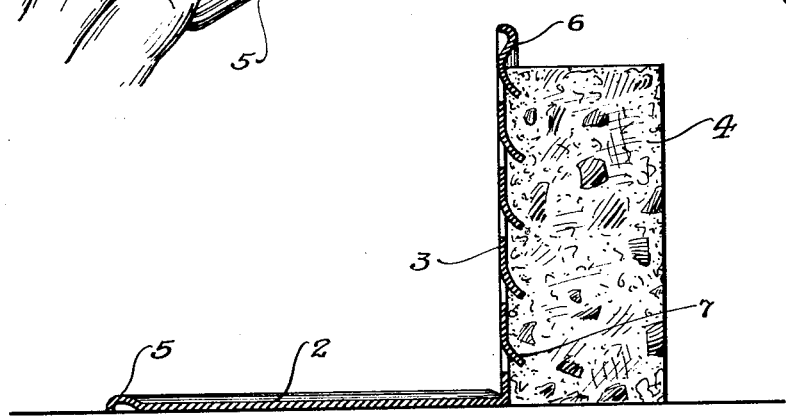
Fig. 2 is a central longitudinal sectional view of the same.

The vertical wing or member 3 is triangular in shape to conform to the configuration of the piece 4 of sausage meat specialty or other molded product, such as dairy cheese, hogshead cheese, bologna, and like products, and the said vertical wing or member is provided with a marginal bead 6 formed by stamping or otherwise shaping the material of the vertical wing or member and projecting fowardly in the direction of the meat, as clearly illustrated in Fig. 2 of the drawing.

The marginal bead 6 forms a shoulder for confining the engaged portion of the material and preserves the form of the same to the last slice.

Figure 3:
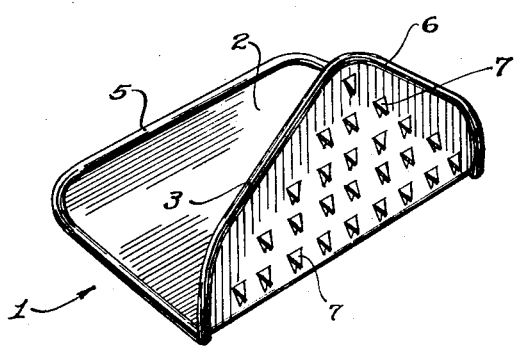
Fig. 3 is a perspective view of the sausage meat holder showing the same in a different position from that illustrated in Fig. 1 to illustrate the construction of the meat engaging spurs.

The sausage meat or other material is positively engaged and held by rows of downwardly and forwardly extending tapering spurs 7 preferably of triangular shape adapted to be embedded in the sausage meat or other material by a slight downward and forward movement of the holder to position the spurs 7, as illustrated in Fig. 2 of the drawing. This will firmly hold the meat product within the confining marginal flange 6 and the piece 4 of the product may be sliced to the very end and the shape of the product will be preserved to the very last slice. The spurs are formed integral with the flat vertical member 3 by partially severing the spurs from the material of the said member 3 and then bending the spurs outwardly to arrange them in an inclined position with their sharp tapering points extending downwardly, as clearly shown in Fig. 3 of the drawing.

In practice, the triangular piece 4 of the sausage specialty or other product, is placed upon a flat surface, such as a table, and the vertical wing or member of the holder is engaged with one end of the piece 4 with the base of the device resting upon the flat surface. The lower face of the base fits flat against the supporting surface and may be firmly held by the fingers of one hand while the piece 4 is being sliced with an ordinary knife 8, as illustrated in Fig. 1 of the drawing.

What is claimed is:

1. A kitchen utensil consisting of a meat holder constructed of a single piece of sheet metal bent transversely at right angles to form a horizontal base, and a vertical wing, said base being adapted to be held by the hand in a stationary position upon a table or other supporting surface and provided with a marginal bead and the said wing being triangular and having a marginal bead forming a shoulder and providing a seat for one end of a triangular piece of material for confining material to preserve the shape of the same to the last slice, and inclined approximately triangular spurs formed integral with the wing and extending downwardly and outwardly therefrom within the marginal bead, said spurs being arranged to be embedded in the material for holding the same against the supporting surface and against the said flat face of the wing.

2. A portable meat holder comprising a horizontal base adapted to be held by the hand in a stationary position upon a table or other supporting surface and a vertical wing of approximately triangular shape extending across the front of the base and connected to and carried by the same, said wing being provided with a marginal bead defining a seat adapted to receive one end of the triangular piece of material and confining the material to preserve the shape of the same to the last slice, and spurs carried by the front face of the wing and extending outwardly and downwardly therefrom and arranged to be embedded in the material for securing the same to the holder, whereby the material is adapted to be held stationary while slicing.

CHARLES T. WALTER.